United States Patent [19]

Hong

[11] 4,441,014

[45] Apr. 3, 1984

[54] ELECTRIC SOLDERING IRON TEMPERATURE ADJUSTABLE BY CHANGING HANDLE POSITION DURING USE

[76] Inventor: Rong-Fu Hong, No. 401 Chiu-Ju 2 Rd., Kaohsiung, Taiwan

[21] Appl. No.: 284,403

[22] Filed: Jul. 17, 1981

[51] Int. Cl.³ .......................... B23K 3/04; H05B 3/02
[52] U.S. Cl. .............................. 219/240; 200/61.58 R; 200/61.85; 200/225; 219/238; 219/486; 219/506; 219/508; 219/533
[58] Field of Search .................... 219/221, 227–233, 219/235–241, 533, 507, 508, 509, 483, 484, 486, 487, 506; 200/225, 157, 61.85, 61.58 R

[56] References Cited

U.S. PATENT DOCUMENTS

| 990,265 | 4/1911 | Hertzberg et al. | 219/240 |
|---|---|---|---|
| 2,147,981 | 2/1939 | Kuehl | 219/240 |
| 2,232,590 | 2/1941 | Craig | 200/225 |
| 3,088,014 | 4/1963 | Stewart | 200/225 |
| 3,198,919 | 8/1965 | Tettke et al. | 200/225 |
| 3,247,358 | 4/1966 | Schmidt | 219/240 |

FOREIGN PATENT DOCUMENTS

| 167679 | 2/1951 | Austria | 219/240 |
|---|---|---|---|
| 55-100871 | 8/1980 | Japan | 219/240 |
| 532171 | 1/1941 | United Kingdom | 219/507 |

Primary Examiner—A. Bartis
Attorney, Agent, or Firm—Holman & Stern

[57] ABSTRACT

A temperature-adjustable electric soldering iron manipulable with a single hand to change the temperature of the iron comprises a handle, a circuit board, a Nichrome tip heating wire, a cover for the wire and a soldering tip. On the circuit board are two mercury switches, a diode, and five resistances, connected in a manner to provide four circuits connected with the Nichrome wire so that the tip can be heated to four different temperatures dependent upon which circuit is connected in series with the Nichrome wire. The circuit board is placed inside the handle and the mercury switches are arranged so that holding the handle in a completely horizontal position shuts off the electric circuit, but tilting it forward or backward, or turning it around to the left or to the right actuates the mercury switches by means of the function of the mercury drop which connects respective circuit contacts at either end of the switches to place a different one of the four circuits in series with the Nichrome wire. This iron is manipulated by one hand to select four temperatures; 270°–280° C., 260° C., 250° C., and 220° C.

3 Claims, 5 Drawing Figures

U.S. Patent  Apr. 3, 1984  Sheet 1 of 3  4,441,014
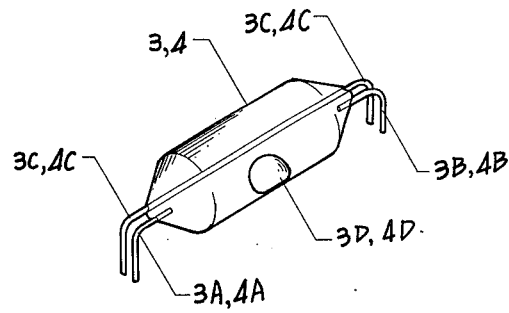
Fig:1
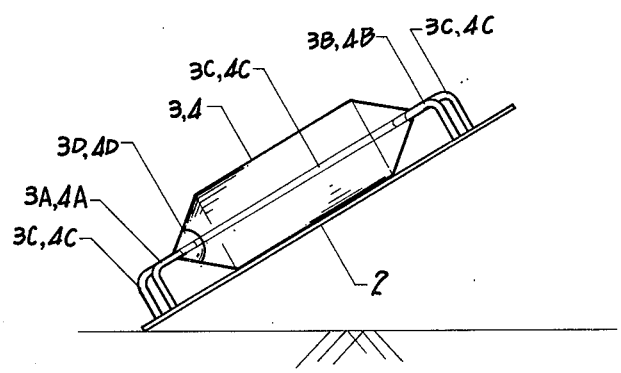
Fig:2
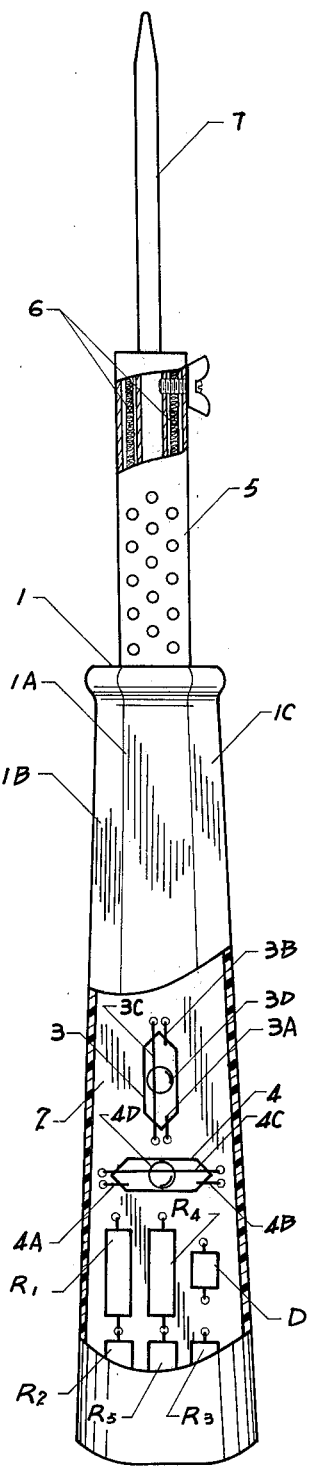
Fig:3

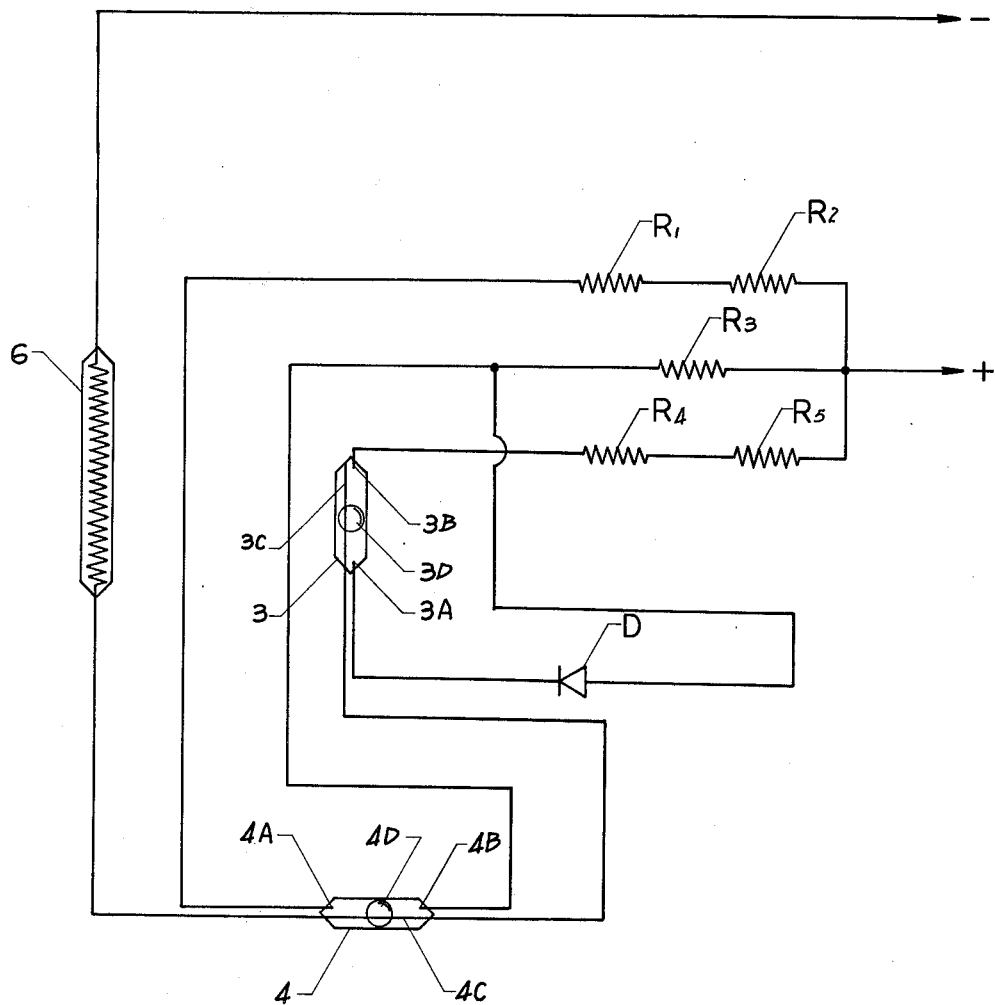
Fig: 4

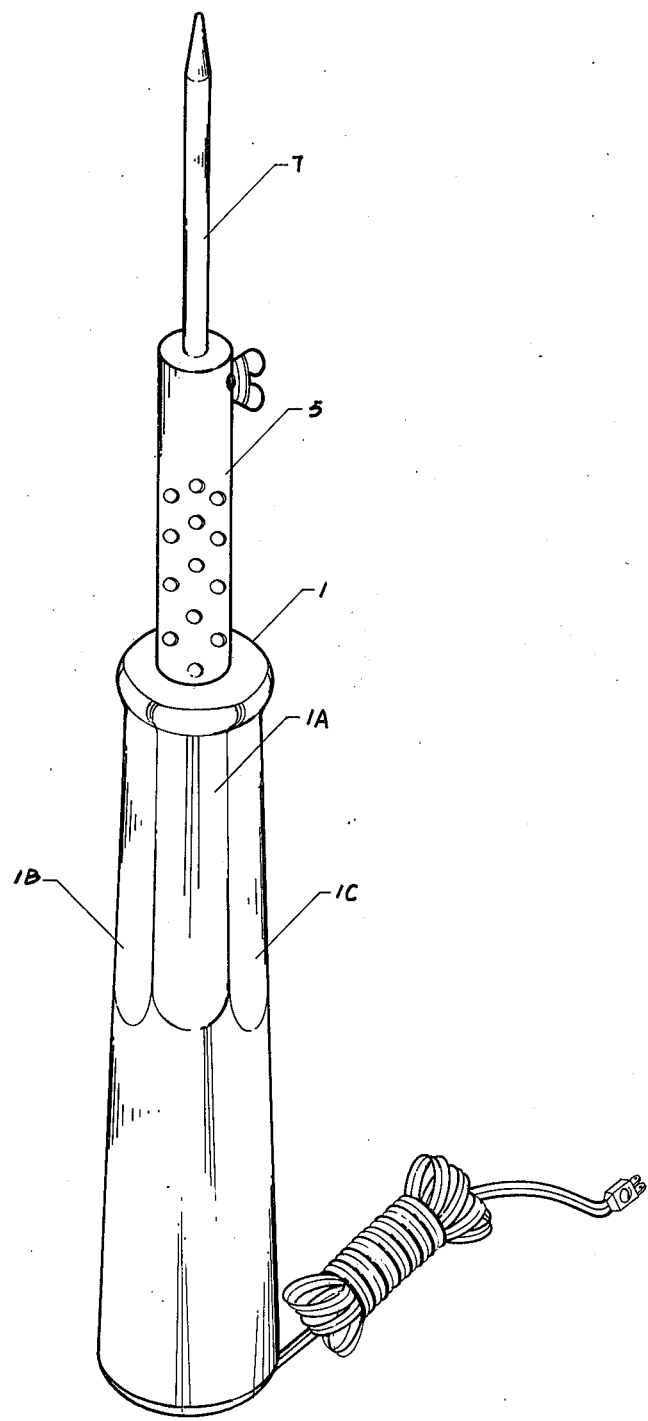
Fig:5

ELECTRIC SOLDERING IRON TEMPERATURE ADJUSTABLE BY CHANGING HANDLE POSITION DURING USE

BACKGROUND OF THE INVENTION

1. Field of the Invention

This invention relates to electric soldering irons having a temperature adjustable soldering tip, and more specifically provides an adjustable temperature control operated merely by manipulating the handle in one hand.

2. Description of the Prior Art

In soldering irons generally used in the electronic industry, workers have to hold an iron with one hand and hold the solder with the other in a soldering operation. There is a wide variety of electronic parts, and consequently different degrees of heat are required, in addition to different periods of time in soldering. If an iron itself is not equipped with a temperature adjusting device, or if a separate temperature adjusting device is to be attached to such an iron, not only are electronic parts often damaged by too high heat or by too low heat, but also the speed of the soldering operation is too slow. These drawbacks cause poor results in a soldering process.

BRIEF SUMMARY OF THE INVENTION

It is an object of this invention to overcome the above drawbacks of the prior art by providing a soldering iron easily temperature adjustable with a single hand. This objective is achieved by providing a hand held soldering iron with two double pole mercury switches each comprised of a hollow tubular casing with a pole at each end, one switch being positioned lengthwise and the other being positioned cross-wise in the handle of the soldering iron so that when the handle is horizontal neither switch is actuated, when tilted vertically about the tip the one switch is actuated and when rotated about the longitudinal axis of the handle the other switch is actuated. Three groups of resistance elements and a diode are each connected in a circuit with a different pole of the switches, the soldering iron tip heating element and power source to selectively control the temperature of the tip by manipulating the handle into various positions to actuate a pole of a switch to place a different group of resistance elements or diode in series with the tip heating element.

BRIEF DESCRIPTION OF DRAWINGS

This invention will now be described in detail, and an embodiment thereof will be described by way of example with reference to the accompanying drawings in which:

FIG. 1 is a perspective view of the mercury switch of this invention;

FIG. 2 is the tilted view of the mercury switch of FIG. 1 showing the switch in a tilted position;

FIG. 3 is a part elevational, part cross view of the structure of this invention;

FIG. 4 is a schematic view of the circuit diagram used in this invention;

FIG. 5 is a perspective view of the soldering iron of this invention.

DESCRIPTION OF THE PREFERRED EMBODIMENT

This temperature-adjustable electric soldering iron manupulable with a single hand consists of handle 1, a circuit board 2, five electric resistances R1, R2, R3, R4, R5, a diode D, two mercury switches 3, 4, a cover 5 for Nichrome wire 6, and a soldering tip 7. The handle 1 is made of plastic for covering and protecting the electronic parts (5 resistances, 2 switches, 1 diode) fixed on the circuit board 2, and for being gripped in a hand for use.

The circuit board 2 is placed inside the handle 1, and the five resistances R1, R2, R3, R4, R5, a diode D and two mercury switches 3, 4 are connected and fixed on the circuit board 2 as FIG. 4 shows. The resistances R1 and R2 having a total of 15 ohms in series are attached with the connecting point for medium heat 4A of the mercury switch 4. The resistance R3 is connected both with the connecting point for high heat 4B of the mercury switch 4 and with the diode D which is connected with the connecting point for preparatory heat 3A of mercury switch 3. The resistances R4, R5 in series total 25 ohms and are connected with the connecting point for low heat 3B of the mercury switch 3.

With a power source of 120 volts connected to the circuit above-mentioned, the soldering tip 7 can be heated to 270°–280° C. through the connecting point for high heat 4B. This high heat can serve for fast soldering of heat-resistant electronic parts or materials of considerably large volume. Next, the soldering tip 7 can be treated to about 260° C., which is suitable for soldering common electronic parts, through the connecting point for medium heat 4A. The soldering tip can be heated to 240°–250° C. suitable for the soldering common transistors and diodes, through the connecting point for low heat 3B. Lastly, through the connecting point for preparatory heat 3A, the soldering tip can be kept at the temperature of 220° C. by means of the rectifying function of the diode D. Then the solder would be kept in the state of half-dissolving but non-oxidizing.

The flow of current through the four connecting points for different degrees of heat is controlled by the two mercury switches 3, 4. The left end of the mercury switch 4 fixed crosswise on the circuit board 2 is the connecting point for medium heat 4A, and the right end of the same switch 4 is the connecting point for high heat 4B, with the common wire 4C so fixed as to pass very near the two connecting points 4A, 4B. There is a mercury drop 4D sealed in the glass tube of the switch, and it will stay in the center part of the glass when the handle 1 is kept horizontal. In this position of the handle the mercury switch 4 is also kept horizontal, so that the circuit is open because the connecting points 4A, 4B are not linked with the common wire 4C. On the other hand, when the handle 1 is turned around either to the left or to the right, the mercury drop 4D rolls down and contacts one of the connecting points 4A, 4B and the common wire 4C at the same time to close the respective circuit.

The mercury switch 3 is fixed lengthwise (i.e. along the length of the handle 1) on the circuit board 2, with the front end as the connecting point for low heat 3B and the rear end as the connecting point for preparatory heat 3A. The common wire 3C passes through the glass tube very near the two points 3A, 3B. The glass tube of the switch 3 also contains a mercury drop 3D, which will function as a switch rolling forward or backward according to the tilting of the handle. In other words, the mercury drop 3D comes to the point for low heat 3B if the handle is tilted forward, but it comes to the point for preparatory heat 3A if the handle is tilted backward.

The structure of the mercury switches 3,4 is shown in the FIG. 1. They are made of a glass tube with two ends of conical shape, and common wires 3C,4C go through the glass tubes; two connecting points are fixed very near the common wires 3C,4C; mercury drops 3D,4D are sealed in the glass tubes, as the particular characteristic of mercury would make itself form a drop. Only when the glass tube is tilted about 30 degrees, does the mercury drop roll down to either of the conical ends, connecting the wire 3C or 4C with either the connecting point 3A or 3B and 4A or 4B, respectively at the same time, thereby closing the circuit so that the current can flow through Nichrome wire 6 to heat the tip 7.

The handle 1 gradually tapers to reduced size in the direction of the cover 5 of the Nichrome wire, and it is equipped with a central flat surface 1A flanked with a left flat surface 1B and a right flat surface 1C. The central flat surface 1A and the left flat surface 1B form a 30-degree angle, as does the central flat surface 1A and the right flat surface 1C. The object of this 30-degree angle is explained as follows. When the handle 1 is held in a hand and the central flat surface 1A is maintained horizontal, the mercury drop 3D, 4D stays around the center of the switch 3, 4, the circuit between the wire 3C, 4C and the point 3A, 4A, 3B, 4B is open and the Nichrome wire is not heated. But, if the central flat surface 1A is tilted only forward or backward, the switch 4 stays horizontal but the switch 3 becomes tilted so that the circuit is closed through either the point for preparatory heat 3A or the point for low heat 3B. If the Nichrome wire must be heated up to high heat or medium heat, the left flat surface 1B or the right flat surface 1C (as viewed in FIG. 3) of the handle 1 rotated around to the position of the central flat surface. Then the switch 4 is activated, and the current begins to flow through the point for high heat 4B or the point for medium heat 4A. The manipulation of the handle is easily effected with the feeling of the hand or the sight of eyes.

In general, this invention is a novel electrical soldering iron with a temperature-adjustable device operable with a single hand. Simple action of tilting the handle forward or backward, or turning it to the left or to the right, can heat the iron to high heat, medium heat, low heat or keep it at preparatory heat. On the other hand, leveling the handle will break all circuits completely allowing the soldering tip to cool. A great advantage of this soldering iron is its simple structure and easy manipulation for controlling the temperature of the soldering tip.

What is claimed are:

1. In an electric soldering iron having a hollow handle, a soldering tip mounted at one end of the handle, an electrical heating element mounted on sad tip in thermal contact therewith, a protective cover surrounding said heating element, a connector for connecting said heating element to a power source, and a temperature control for controlling the temperature of the soldering tip, the improvement wherein said temperature control comprises, a circuit board mounted within the handle, two double pole, double throw mercury switches on said circuit board, each comprising a hollow tubular casing, a mercury drop in said casing, a pole at each end of said casing, and a common line connecting one contact of each of said poles, a first switch being positioned substantially lengthwise in the handle and a second switch being positioned substantially cross-wise in the handle, so that when the handle is substantially horizontal neither switch is actuated and when tilted vertically about said tip said first switch is actuated and when rotated about the longitudinal axis of the handle said second switch is actuated, three groups of resistance elements on said circuit board comprising a first group connected in series through a diode with one end pole of said first switch and adapted to energize said heating element to heat said tip to a preparation temperature when said handle is tilted vertically with the tip above the handle, a second group connected in series with the other end pole of said first switch, a third group having a lower resistance than said second group connected in series with one end pole of said second switch, said first group having a lower resistance than said second and third group and being further connected in series with the other end pole of said second switch, said common line of said first switch being connected to said common line of said second switch and a first terminal of said heating element, and said first group being connected to the non-common contact of said other end pole of said second switch, said first, second and third groups being connected to one terminal of said connector, the other terminal of said connector being connected to the second terminal of said heating element.

2. An electric soldering iron as claimed in claim 1 and further comprising indicating means on said handle to indicate by feeling and sight the position of said second switch.

3. An electric soldering iron as claimed in claim 2 wherein said indicating means comprises three adjoining flat surfaces on the exterior of said handle comprising a first flat surface arranged to lie in a substantially horizontal plane when said switches are in the off position, a second flat surface arranged to lie in a plane at a predetermined angle with respect to said first surface so that when said handle is rotated about its longitudinal axis to a position where said second surface lies substantially in said horizontal plane, one of said end poles of said second switch is connected by the respective mercury drop, and a third flat surface arranged to lie in a plane at a predetermined angle with respect to said first surface so that when said handle is rotated about its longitudinal axis to a position where said third surface lies substantially in said horizontal plane, the other end pole of said second switch is connected by the respective mercury drop.

* * * * *